US009830626B1

(12) United States Patent
Aharoni et al.

(10) Patent No.: US 9,830,626 B1
(45) Date of Patent: Nov. 28, 2017

(54) PRE-CALCULATED PERFORMANCE SIMULATION

(71) Applicant: EMC Corporation, Hopkinton, MA (US)

(72) Inventors: Ophir Aharoni, Brookline, MA (US); Gil Ratsaby, Boston, MA (US); Sergey Rytenkov, St. Petersburg (RU); Dan Aharoni, Brookline, MA (US); Hagay Dagan, Pardes Hanna-Karkur (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 768 days.

(21) Appl. No.: 14/193,541

(22) Filed: Feb. 28, 2014

(51) Int. Cl.
    *G06Q 30/00* (2012.01)
    *G06F 17/24* (2006.01)
    *G06Q 30/06* (2012.01)

(52) U.S. Cl.
    CPC ..... *G06Q 30/0613* (2013.01); *G06Q 30/0631* (2013.01)

(58) Field of Classification Search
    USPC .......................................................... 715/234
    See application file for complete search history.

(56) References Cited

U.S. PATENT DOCUMENTS

| 6,990,433 | B1* | 1/2006 | McCutcheon | G06F 11/348 324/512 |
| 7,058,560 | B1* | 6/2006 | Arakawa | G06F 11/3452 702/182 |
| 2010/0146399 | A1* | 6/2010 | Stinson | H04L 67/34 715/744 |
| 2011/0246635 | A1* | 10/2011 | Phukan | G06Q 10/06 709/223 |
| 2012/0071216 | A1* | 3/2012 | Salsbery | G06F 1/3203 455/574 |
| 2013/0174015 | A1* | 7/2013 | Jeff | G06F 17/30905 715/234 |

* cited by examiner

Primary Examiner — Ariel J Yu
(74) Attorney, Agent, or Firm — Anderson Gorecki LLP

(57) ABSTRACT

A method, apparatus and computer program product for providing pre-calculated performance simulation is presented. Performance simulations for a storage system are provided by selecting a subset of system configuration options from a large set of system configuration options. Simulation results for the subset of system configuration options are pre-calculated. The simulation results for the subset of system configuration options are loaded on a portable device. System configuration requirements for a customer are received and at least one system configuration option is selected from the subset of system configuration options based on the simulation results and the system configuration requirements for a customer.

18 Claims, 4 Drawing Sheets

PRE-CALCULATED PERFORMANCE SIMULATION

CROSS REFERENCE TO RELATED APPLICATIONS

This application claims priority to the U.S. Provisional Patent Application that results from the conversion of U.S. Utility patent application Ser. No. 14/141,932, filed Dec. 27, 2013, which was entitled PRE-CALCULATED PERFORMANCE SIMULATION, the content of which is hereby incorporated herein by reference. Applicants filed a petition to convert this Utility patent application to a provisional application on Feb. 26, 2014, and are thus claiming priority to the provisional application that results therefrom.

BACKGROUND

A customer may need to upgrade a current computer system or purchase a new computer system. A computer system salesperson needs to suggest potential systems that not only can handle the customer system demands but also the customer's price point. The salesperson therefore is required to simulate systems for different workloads, as well as determining things such as what happens if more disk drives or CPUs are added in order to provide the customer with one or more potential system configurations that will meet the customer's requirements.

In the past several years a new trend has started which is moving from personal computers with significant CPU and memory capabilities to tablets and smartphones with limited computation capacity. This new trend poses a challenge for Central Processing Unit (CPU) and memory "hungry" applications. One such application is the performance simulators used by pre and post sales workforce for their troubleshooting and planning tools with respect to capacity planning. The computer system salesperson preferably should be able to use an application on a portable device (e.g., a smartphone or tablet) to answer all these questions and determine one or more computer system configurations that will meet the customer's needs, and to do so in a timely and efficient manner.

SUMMARY

Conventional mechanisms such as those explained above suffer from a variety of deficiencies. One such deficiency is that when a portable device such as a tablet or smartphone is used, the portable device is unable to provide the processing power or memory requirements to run the simulation since they do not have the computational power for such a task, a network is required for the salesperson to offload the computing portion of the application. One solution to this challenge is to use the "cloud". For example, the salesperson would use the portable device only as a graphical user interface (GUI) and send all the complex calculation, e.g. via some web service, to servers in the cloud to perform the calculations. The downside of such an approached is the requirement to be connected to the network in order to use the application. Although this is becoming less of an issue with time, it is still a limitation. For example, a salesperson at a customer site may not be allowed to have access to the customer network or when that salesperson is on the road, a network is not always sufficiently available.

Embodiments of the invention significantly overcome such deficiencies and provide mechanisms and techniques that provide a pre-calculated performance simulation. In a particular embodiment of a method for providing a pre-calculated performance simulation the method includes selecting a subset of system configuration options from a large set of system configuration options. The method further includes pre-calculating simulation results for the subset of system configuration options. Additionally the method includes receiving system configuration requirements for a customer. The method also includes method selecting at least one set of system configuration options based on the system configuration requirements for a customer. The method further includes determining preferred system configuration options from the at least one system configuration option and verifying, with an external system, the preferred system configuration options are capable of meeting conditions for the customer requirements.

Other embodiments include a computer readable medium having computer readable code thereon for providing pre-calculated performance simulation. In a particular embodiment, the computer readable medium includes instructions for providing a pre-calculated performance simulation. The computer readable medium includes instructions for selecting a subset of system configuration options from a large set of system configuration options. The computer readable medium further includes instructions for pre-calculating simulation results for the subset of system configuration options. Additionally the computer readable medium includes instructions for receiving system configuration requirements for a customer. The computer readable medium also includes instructions for selecting at least one set of system configuration options based on the system configuration requirements for a customer. The computer readable medium further includes instruction for determining preferred system configuration options from the at least one system configuration option and instructions for verifying, with an external system, the preferred system configuration options are capable of meeting conditions for the customer requirements.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides pre-calculated performance simulation as explained herein that when performed (e.g. when executing) on the processor, operates as explained herein within the computerized device to perform all of the method embodiments and operations explained herein as embodiments of the invention. Thus any computerized device that performs or is programmed to perform the processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing pre-calculated performance simulation an attribute level change history as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below. All examples and features mentioned below can be combined in any technically possible way.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
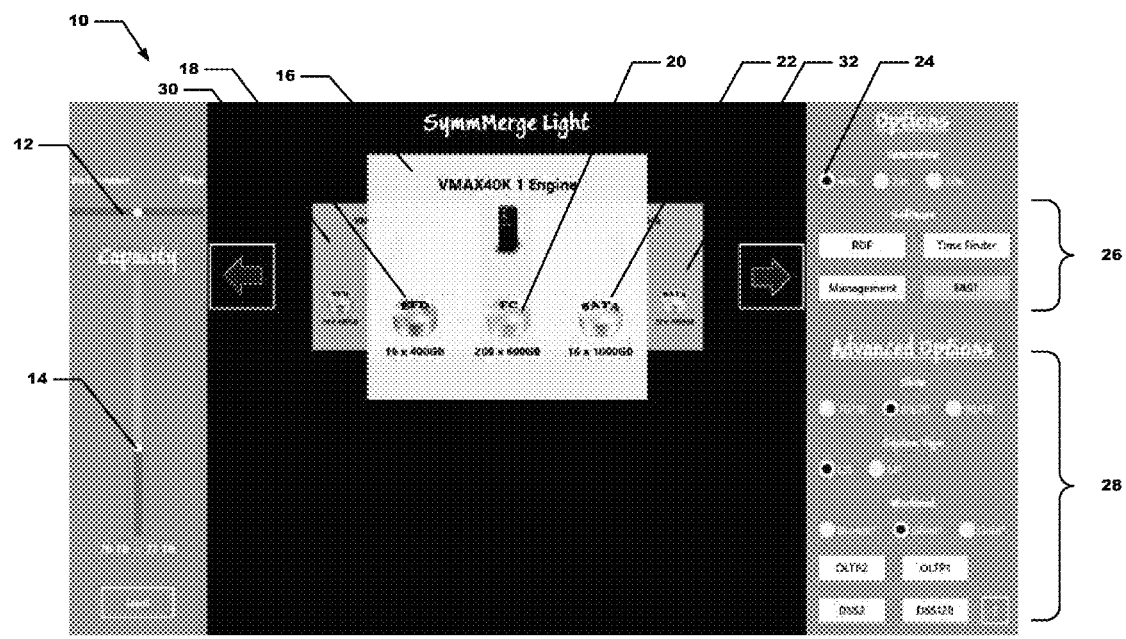
FIG. 1 shows a screen shot of input data and output data for a performance simulator.

The embodiments set forth below represent the necessary information to enable those skilled in the art to practice the invention and illustrate the best mode of practicing embodiments of the invention. Upon reading the following description in light of the accompanying figures, those skilled in the art will understand the concepts of the invention and recognize applications of these concepts not particularly addressed herein. It should be understood that these concepts and applications fall within the scope of the disclosure and the accompanying claims.

The preferred embodiment of the invention will now be described with reference to the accompanying drawings. The invention may, however, be embodied in many different forms and should not be construed as limited to the embodiment set forth herein; rather, this embodiment is provided so that this disclosure will be thorough and complete, and will fully convey the scope of the invention to those skilled in the art. The terminology used in the detailed description of the particular embodiment illustrated in the accompanying drawings is not intended to be limiting of the invention. In the drawings, like numbers refer to like elements.

The presently disclosed method and apparatus for performing pre-calculated performance simulation provides a new and practical approach to performance simulation. While a performance simulations for storage systems are used in this description, it should be appreciated that the present invention should not be limited to storage systems and applies to other types of systems as well. Instead of allowing the user to enter any input to their performance simulation application, the inputs are limited to a discrete set of options, which may amount to be many thousands and cover a most reasonable set of options. These options may be limited to a known best practices set of options. These options, for example, may only use disk drives in multiples of sixteen, only use Redundant Array of Inexpensive Disks (RAID) drive. For example, only RAID-5 configured drives are used for one set of drives and only use RAID-1 configured drives for a second set of drives. This discrete set of options are pre-calculated and the results of the simulations of all the options are loaded to the tablet/smartphone with the application. This results in hundreds of thousands of potential configurations instead of several million potential configurations. This allows the application to avoid the calculation phase and only load the pre-calculated result for any input the user selected. This makes the application quick and very responsive even on platforms with very limited resources.

A salesperson is given a set of customer requirements and uses this information to determine a system to sell this customer. Given a particular load the salesperson determines what systems are available to meet the customer's requirements. This is accomplished by way of a portable device application with a relatively simple set of input requirements that help determine what type of storage system configurations are feasible for this scenario. Once the salesperson has a system configuration that should satisfy the customer's needs, the salesperson can then provide that configuration to his or her technical person to verify that the proposed system can indeed handle the customer's requirements.

FIG. 1 shows a first screen shot of an example for the application running on a portable device. The input 10 is providing certain requirements such as capacity, workload and workload type, as well as some pricing information. Input 10 includes a first slider 12 for selecting a performance/price point. A second slider 14 is also shown for selecting the storage capacity of the proposed system. In this example the salesperson has selected a 40K generation single processor 24 option as well as software 26 including Symmetrix Remote data Facility (RDF), Time Finder and Management. Advanced options 28 include a skew of 80/20, an Open System (OS) type and a Silver level workload. Also selected are Online Transaction Processing (OLTP2), OLTP1, Decision Support System (DSS2), and DSS128. The output 16 shows a system, here a VMAX40K 1 Engine, having 16 400 Gigabyte (GB) Enterprise Flash Drive (EFD) drives (18). Enterprise flash drives are solid-state drives (SSD's) that have been manufactured to meet the reliability required in an enterprise storage array. The system also includes 208 600 GB Fibre Channel (FC) drives (20). Fibre Channel is a hard disk drive interface technology designed primarily for high-speed data throughput for high-capacity storage systems, usually set up as a disk array or RAID. The system further includes 16 1000 GB Serial Advanced Technology Attachment (SATA) drives (22). SATA drives are commonly used in RAID configurations. Other potential system configurations (30, 32) that also meet the customer's requirements are shown behind system 16.

Figure 2:
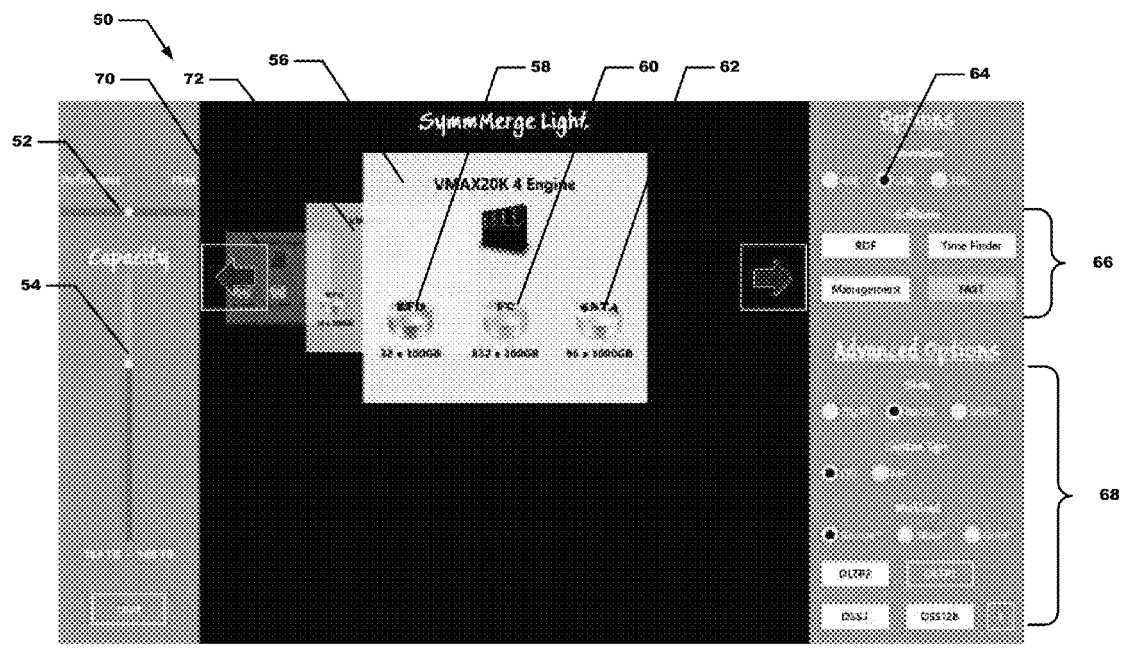
FIG. 2 shows a second screen shot of input data and output data from the performance simulator.

FIG. 2 shows a second screen shot of an example for the application running on a portable device. The input 50 is providing certain requirements such as capacity, workload and workload type, as well as some pricing information. Input 50 includes a first slider 52 for selecting a performance/price point. A second slider 54 is also shown for selecting the storage capacity of the proposed system. In this example the salesperson has selected a 20K generation single processor 24 option as well as software626 including Symmetrix Remote data Facility (RDF), Time Finder and Management. Advanced options 68 include a skew of 80/20, an Open System (OS) type and a Bronze level workload. Also selected are Online Transaction Processing (OLTP2), Decision Support System (DSS2), and DSS128. The output shows a system, here a VMAX20K 1 Engine having four processors. The system has 32 100 GB EFD drives (18), 832 300 GB FC drives (60) and 96 1000 GB SATA drives (62). Other potential system configurations (70, 72) that also meet the customer's requirements are shown behind system 56.

The salesperson will select at least one system configuration option from the subset of system configuration options based on the simulation results and the system configuration requirements for a customer. The simulation results may provide more than one solution that will meet the customer's requirements. A preferred system configuration options is selected from the at least one system configuration option. The preferred system configuration will be verified with an external system, to insure the preferred system configuration options are capable of meeting conditions for the customer requirements.

Figure 3:
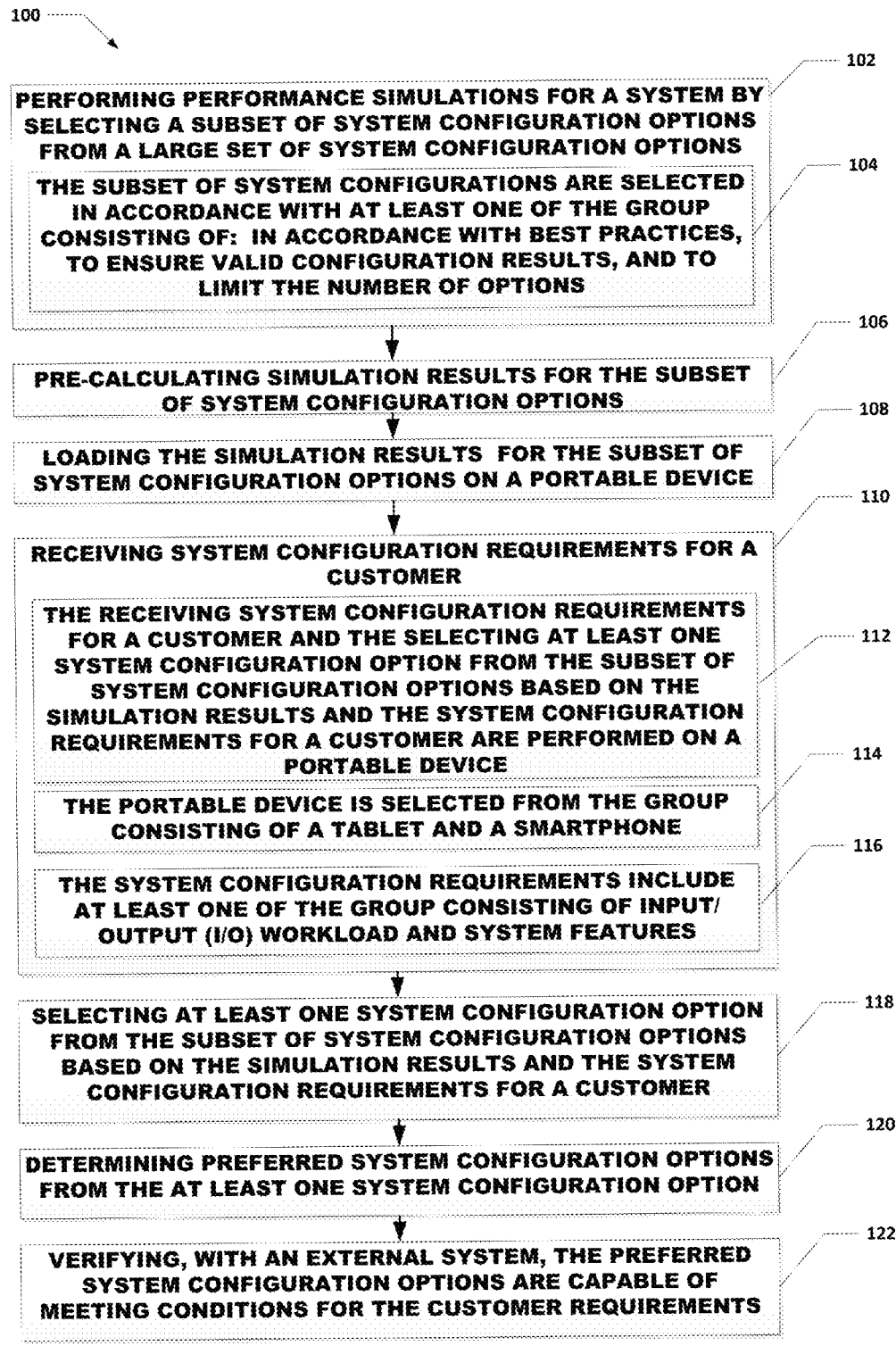
FIG. 3 depicts a flow diagram of a particular embodiment of a method of performing pre-calculated performance simulation.

A flow chart of a particular embodiment of the presently disclosed method 100 is depicted in FIG. 3. The rectangular elements are herein denoted "processing blocks" and represent computer software instructions or groups of instructions. The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 3, in a particular embodiment of a method for providing pre-calculated performance simulation, the method begins with processing block 102 which discloses performing performance simulations for a system by selecting a subset of system configuration options from a large set of system configuration options. As sown in processing block 104 system configuration requirements include at least one of the group consisting of Input/Output (I/O) workload and system features. For example, only RAID-5 configured drives are used for one set of drives and only RAID-1 configured drives are used for a second set of drives.

Processing block 106 states pre-calculating simulation results for the subset of system configuration options. The discrete set of options are pre-calculated and the results of the simulations of all the options are loaded to the tablet/smartphone with the application.

Processing block 108 recites loading the simulation results for the subset of system configuration options on a portable device. This results in hundreds of thousands of potential configurations instead of several million potential configurations. This allows the application to avoid the calculation phase and only load the pre-calculated result for any input the user selected. This makes the application quick and very responsive even on platforms with very limited resources.

Processing continues with processing block 110 which discloses receiving system configuration requirements for a customer. The customer may be looking to simply upgrade older hardware with new hardware or may need additional processing power or storage capabilities. As sown in processing block 112 the receiving system configuration requirements for a customer and the selecting at least one system configuration option from the subset of system configuration options based on the simulation results and the system configuration requirements for a customer are performed on a portable device. As further shown in processing block 114, the portable device is selected from the group consisting of a tablet and a smartphone. For example, the portable device may be realized as a handheld device having limited processing power and/or memory capability. Portable devices include, but are not limited to Iphones® or Ipads®, available from Apple Computer Company of Cupertino, Calif. As also shown in processing block 116, the system configuration requirements include at least one of the group consisting of Input/Output (I/O) workload and system features.

Processing block 118 states selecting at least one system configuration option from the subset of system configuration options based on the simulation results and the system configuration requirements for a customer. The simulation results may provide more than one solution that will meet the customer's requirements. As shown in processing block 120, a preferred system configuration option is chosen from the at least one system configuration option. As shown in processing block 122, while not required, optionally the method could further include verifying, with an external system, the preferred system configuration options are capable of meeting conditions for the customer requirements.

Figure 4:
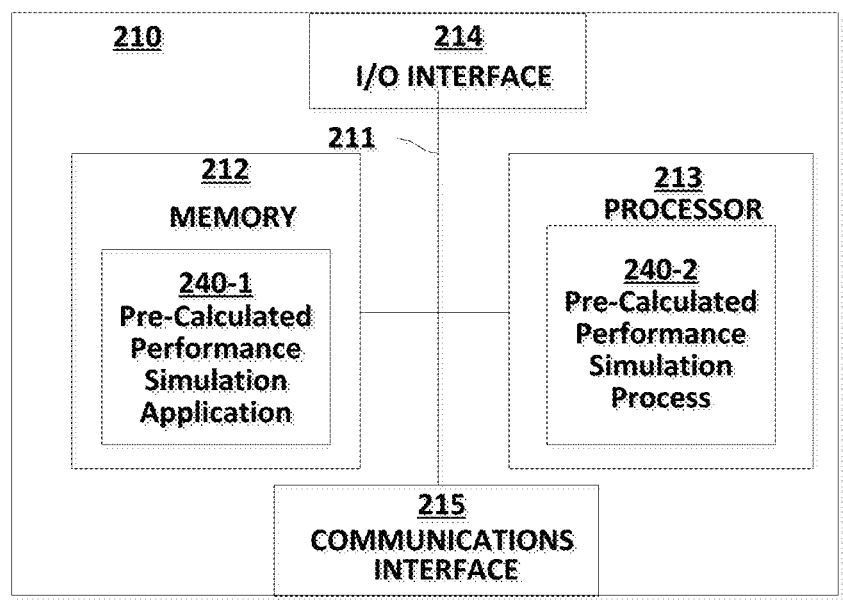
FIG. 4 illustrates an example portable computer system architecture for a computer system that performs pre-calculated performance simulation in accordance with embodiments of the invention.

FIG. 4 is a block diagram illustrating an example architecture of a portable computer system 210 that executes, runs, interprets, operates or otherwise performs a pre-calculated performance simulation operating application 240-1 and pre-calculated performance simulation operating process 240-2 suitable for use in explaining example configurations disclosed herein. The computer system 210 may be any type of computerized device such as a personal computer, workstation, portable computing device, console, laptop, network terminal or the like. An input device 216 (e.g., one or more customer/developer controlled devices such as a keyboard, mouse, etc.) couples to processor 213 through I/O interface 214, and enables a customer 208 to provide input commands, and generally control the graphical customer interface 260 that the pre-calculated performance simulation operating application 240-1 and process 240-2 provides on the display 230. Essentially, the graphical user interface 260 is where the customer 208-1 performs their 'online banking', specifying which bills are to be paid electronically, when those bills are to be paid, and the amount to be paid. As shown in this example, the computer system 210 includes an interconnection mechanism 211 such as a data bus or other circuitry that couples a memory system 212, a processor 213, an input/output interface 214, and a communications interface 215. The communications interface 215 enables the computer system 210 to communicate with other devices (i.e., other computers) on a network (not shown).

The memory system 212 is any type of computer readable medium, and in this example, is encoded with a pre-calculated performance simulation operating application 240-1 as explained herein. The pre-calculated performance simulation operating application 240-1 may be embodied as software code such as data and/or logic instructions (e.g., code stored in the memory or on another computer readable medium such as a removable disk) that supports processing functionality according to different embodiments described herein. During operation of the computer system 210, the processor 213 accesses the memory system 212 via the interconnect 211 in order to launch, run, execute, interpret or otherwise perform the logic instructions of a pre-calculated performance simulation operating application 240-1. Execution of a pre-calculated performance simulation operating application 240-1 in this manner produces processing functionality in the pre-calculated performance simulation operating process 240-2. In other words, the pre-calculated performance simulation operating process 240-2 represents one or more portions or runtime instances of a pre-calculated performance simulation operating application 240-1 (or the entire a pre-calculated performance simulation operating application 240-1) performing or executing within or upon the processor 213 in the computerized device 210 at runtime.

It is noted that example configurations disclosed herein include the pre-calculated performance simulation operating application 240-1 itself (i.e., in the form of un-executed or non-performing logic instructions and/or data). The pre-calculated performance simulation operating application 240-1 may be stored on a computer readable medium (such as a floppy disk), hard disk, electronic, magnetic, optical, or other computer readable medium. A pre-calculated performance simulation operating application 240-1 may also be stored in a memory system 212 such as in firmware, read only memory (ROM), or, as in this example, as executable code in, for example, Random Access Memory (RAM). In addition to these embodiments, it should also be noted that other embodiments herein include the execution of a pre-calculated performance simulation operating application 240-1 in the processor 213 as the pre-calculated performance simulation operating process 240-2. Those skilled in the art will understand that the computer system 210 may include other processes and/or software and hardware components, such as an operating system not shown in this example.

A display 230 need not be coupled directly to computer system 210. For example, the pre-calculated performance simulation operating application 240-1 can be executed on a remotely accessible computerized device via the network interface 215. In this instance, the graphical customer interface 260 may be displayed locally to a customer 208 of the remote computer, and execution of the processing herein may be client-server based.

During operation, processor 213 of computer system 200 accesses memory system 212 via the interconnect 211 in order to launch, run, execute, interpret or otherwise perform the logic instructions of the pre-calculated performance simulation application 240-1. Execution of pre-calculated performance simulation application 240-1 produces processing functionality in pre-calculated performance simulation process 240-2. In other words, the pre-calculated performance simulation process 240-2 represents one or more portions of the pre-calculated performance simulation application 240-1 (or the entire application) performing within or upon the processor 213 in the computer system 200.

It should be noted that, in addition to the pre-calculated performance simulation process 240-2, embodiments herein include the pre-calculated performance simulation application 240-1 itself (i.e., the un-executed or non-performing logic instructions and/or data). The pre-calculated performance simulation application 240-1 can be stored on a computer readable medium such as a floppy disk, hard disk, or optical medium. The pre-calculated performance simulation application 240-1 can also be stored in a memory type system such as in firmware, read only memory (ROM), or, as in this example, as executable code within the memory system 212 (e.g., within Random Access Memory or RAM).

In addition to these embodiments, it should also be noted that other embodiments herein include the execution of pre-calculated performance simulation application 240-1 in processor 213 as the pre-calculated performance simulation process 240-2. Those skilled in the art will understand that the computer system 200 can include other processes and/or software and hardware components, such as an operating system that controls allocation and use of hardware resources associated with the computer system 200.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method in which a computer system performs operations comprising:
   performing performance simulations on a first computer by selecting a subset of system configuration options from a set of system configuration options;
   pre-calculating performance simulation results for said subset of system configuration options on the first computer;
   loading said performance simulation results for said subset of system configuration options on a second computer that is a portable handheld device;
   receiving, by the second computer, system configuration requirements for a customer; and
   selecting, on the second computer, at least one system configuration option from said subset of system configuration options based on said performance simulation results and said system configuration requirements for the customer.

2. The method of claim 1 further comprising determining preferred system configuration options from said at least one system configuration option.

3. The method of claim 2 further comprising verifying, with an external system, said preferred system configuration options are capable of meeting conditions for said customer requirements.

4. The method of claim 1 wherein said portable device is selected from the group consisting of a tablet and a smartphone.

5. The method of claim 1 wherein said system configuration requirements include at least one of the group consisting of Input/Output (I/O) workload, storage capacity and system features.

6. The method of claim 1 wherein said subset of system configurations are selected in accordance with at least one of the group consisting of: in accordance with best practices, to ensure valid configuration results, and to limit the number of options.

7. A non-transitory computer readable storage medium having computer readable code thereon for providing pre-calculated performance simulation, the medium including instructions in which a computer system performs operations comprising:
   performing performance simulations on a first computer by selecting a subset of system configuration options from a set of system configuration options;
   pre-calculating performance simulation results for said subset of system configuration options on the first computer;
   loading said performance simulation results for said subset of system configuration options on a second computer that is a portable handheld device;
   receiving, by the second computer, system configuration requirements for a customer; and
   selecting, on the second computer, at least one system configuration option from said subset of system configuration options based on said performance simulation results and said system configuration requirements for the customer.

8. The non-transitory computer readable storage medium of claim 7 further comprising determining preferred system configuration options from said at least one system configuration option.

9. The non-transitory computer readable storage medium of claim 8 further comprising verifying, with an external system, said preferred system configuration options are capable of meeting conditions for said customer requirements.

10. The non-transitory computer readable storage medium of 7 wherein said portable device is selected from the group consisting of a tablet and a smartphone.

11. The non-transitory computer readable storage medium of claim 7 wherein said system configuration requirements include at least one of the group consisting of Input/Output (I/O) workload, storage capacity and system features.

12. The non-transitory computer readable storage medium of claim 7 wherein said subset of system configurations are selected in accordance with at least one of the group consisting of: in accordance with best practices, to ensure valid configuration results, and to limit the number of options.

13. A handheld portable computer system comprising:
a memory;
a processor;
a communications interface;
an interconnection mechanism coupling the memory, the processor and the communications interface; and
wherein the memory is encoded with an application using pre-calculated performance simulations, that when performed on the processor, provides a process for processing information, the process causing the handheld portable computer system to perform the operations of:
loading performance simulation results for a subset of system configuration options on said portable device from another computer;
receiving system configuration requirements for a customer; and
selecting at least one system configuration option from said subset of system configuration options based on said performance simulation results and said system configuration requirements for the customer.

14. The handheld portable computer system of claim 13 further comprising determining preferred system configuration options from said at least one system configuration option.

15. The handheld portable computer system of claim 14 further comprising verifying, with an external system, said preferred system configuration options are capable of meeting conditions for said customer requirements.

16. The handheld portable computer system of claim 13 wherein said portable device is selected from the group consisting of a tablet and a smartphone.

17. The handheld portable computer system of claim 13 wherein said system configuration requirements include at least one of the group consisting of Input/Output (I/O) workload, storage capacity and system features.

18. The handheld portable computer system of claim 13 wherein said subset of system configurations are selected in accordance with at least one of the group consisting of: in accordance with best practices, to ensure valid configuration results, and to limit the number of options.

* * * * *